(12) United States Patent
Brinkmann

(10) Patent No.: US 9,808,123 B1
(45) Date of Patent: Nov. 7, 2017

(54) SHOE ASSEMBLY

(71) Applicant: Donald Allan Brinkmann, Golden, CO (US)

(72) Inventor: Donald Allan Brinkmann, Golden, CO (US)

( * ) Notice: Subject to any disclaimer, the term of this patent is extended or adjusted under 35 U.S.C. 154(b) by 0 days.

(21) Appl. No.: 15/623,819

(22) Filed: Jun. 15, 2017

Related U.S. Application Data

(60) Continuation-in-part of application No. 15/016,268, filed on Feb. 5, 2016, now abandoned, which is a division of application No. 13/959,276, filed on Aug. 5, 2013, now Pat. No. 9,291,301.

(60) Provisional application No. 61/679,795, filed on Aug. 6, 2012.

(51) Int. Cl.
*A47J 47/16* (2006.01)
*F16M 13/02* (2006.01)
*A47L 17/00* (2006.01)
*A47J 47/20* (2006.01)

(52) U.S. Cl.
CPC ............ *A47J 47/16* (2013.01); *A47L 17/00* (2013.01); *F16M 13/02* (2013.01); *F16M 13/022* (2013.01); *A47J 47/20* (2013.01)

(58) Field of Classification Search
USPC ............... 248/110, 346.01, 346.03, 346.5; 220/737, 738, 740, 741, 742, 571, 630, 220/636, 735, 736, 729, 694
See application file for complete search history.

(56) References Cited

U.S. PATENT DOCUMENTS

| | | | | |
|---|---|---|---|---|
| 3,029,975 A | * | 4/1962 | Aiello ............... | A47G 23/0266 220/742 |
| 4,654,274 A | * | 3/1987 | DeMars ............. | A47G 23/0216 215/395 |
| 4,791,030 A | * | 12/1988 | DeMars ............. | A47G 23/0216 215/395 |
| 4,993,671 A | * | 2/1991 | Ste. Marie ............. | A46B 17/02 211/65 |
| 5,033,704 A | * | 7/1991 | Kerr ....................... | B44D 3/123 220/697 |
| 5,545,447 A | * | 8/1996 | DeMars ............. | A47G 23/0216 215/396 |
| 5,582,321 A | * | 12/1996 | Urbanczyk ........ | A47G 23/0266 220/626 |
| 5,913,450 A | * | 6/1999 | Runkel ............... | B44D 3/123 220/696 |

(Continued)

*Primary Examiner* — Alfred J Wujciak
(74) *Attorney, Agent, or Firm* — Roger A. Jackson

(57) ABSTRACT

The present invention support devices and shoe assembly are for an article that is adjacent to a sink margin, the present invention provides a storage solution for the article and holds the article in an upright position, thereby helping to prevent seepage and loss of soap fluids from the article and also directs sponge drainage either into a sink or a container. The present invention works on sinks that are either under-mounted or drop-in sinks, or can be positioned adjacent to a sink on the countertop. The present invention is easily movable, can be placed in multiple locations, can be easily cleaned and function without the need for suction cups or other attachments. When the article is being used, the present invention is out of the way resulting in minimal conflict with the use and activity around the sink, thereby allowing maximum unimpeded use of the sink area.

1 Claim, 15 Drawing Sheets

(56) References Cited

U.S. PATENT DOCUMENTS

| | | | | |
|---|---|---|---|---|
| 7,527,164 B1* | 5/2009 | Reichborn | ............. | B44D 3/123 |
| | | | | 220/570 |
| 7,568,667 B1* | 8/2009 | Feik | ....................... | B44D 3/123 |
| | | | | 248/128 |
| 2007/0286016 A1* | 12/2007 | Sun | .................... | A47G 23/0216 |
| | | | | 366/279 |

* cited by examiner

SHOE ASSEMBLY

RELATED PATENT APPLICATIONS

This application is a continuation in part application of divisional application Ser. No. 15/016,268 filed on Feb. 5, 2016 by Donald Allan Brinkmann of Golden, Colo., US as inventor, wherein the divisional application Ser. No. 15/016,268 is a divisional of U.S. patent application Ser. No. 13/959,276 filed on Aug. 5, 2013, by Donald Allan Brinkmann of Golden, Colo., US, as inventor that claims the benefit of U.S. provisional patent application Ser. No. 61/679,795 filed on Aug. 6, 2012 by Donald Allan Brinkmann of Golden, Colo., U.S. as inventor.

TECHNICAL FIELD

The present invention relates generally to a support for an article for use with the support interfacing with multiple base components. More specifically, the present invention is a shoe assembly that removably engages a self contained cleaning utensil wherein the shoe assembly directs fluid seepage from the cleaning utensil to a selected area in relation to the base component.

BACKGROUND OF INVENTION

Cleaning utensils are constantly becoming more numerous and varied over time in performing more specialized functions leading to a plethora of these handheld utensils being randomly placed throughout the kitchen countertop area adding to clutter and potentially a soap scum and water/grease stains on the countertop requiring cleaning. As a more modern development in particular related to scrubbers for dishes, glasses, and cooking utensils, is a self contained scrubbing brush and scouring pad, wherein a reservoir is disposed within an integral handle that contains a dishwashing liquid, thus eliminating the need for the separate application of dishwashing liquid, resulting in faster, easier, and more convenient dish, glass, and cooking utensil washing as the dishwashing liquid automatically dispenses to the sponge/brush/pad.

However, this self contained scrubbing brush and scouring pad again is usually placed upon the countertop, or in the sink, or adjacent to the sink edge and with this self contained scrubbing brush and scouring pad not having any sophisticated valves or shutoffs to prevent the seepage or wicking of the dishwashing fluid from the scrub brush or scouring pad portion thereby resulting in a gooey mess of oozed out dishwashing liquid, that also typically semi solidifies into almost a paste type substance when exposed to the atmosphere. Thus leaving a sticky gooey mess to clean up from the surface that is adjacent to the scrub brush or scouring pad, not to mention the waste of dishwashing liquid.

Wherein an ideal solution to this problem would be to support the scrub brush or scouring pad portion above the reservoir to help prevent the seepage or wicking of the dishwashing fluid from the scrub brush or scouring pad portion, and to have or provide flow channels for the dishwashing liquid seepage that does occur being the residual dishwashing liquid from the scrub brush or scouring pad portion to drain to a specific location to make clean up on the seeped dishwashing liquid easier.

Looking at the prior art, in U.S. Pat. No. 6,619,604 to Stillman, disclosed is a tray for supporting a cleaning utensil that has a holder for supporting a cleaning utensil that includes a support platform that is designed to support and retain a portion of a cleaning utensil, the holder also has a drainage conductor near a front edge of the support platform. In Stillman, the portion of the cleaning utensil is retained via a continuous retention ridge protrusion adjacent to a drainage channel, wherein a suction cup is for attaching the holder to a countertop or sink lip.

Continuing in the prior art, in U.S. Pat. No. 6,991,200 to Stillman which is a continuation of U.S. Pat. No. 6,619,604 also to Stillman, the '200 patent discloses a holder for supporting a cleaning utensil that includes a support platform that is designed to support and retain a portion of a cleaning utensil, the holder also has a drainage conductor near a front edge of the support platform. In Stillman, the portion of the cleaning utensil is retained via a continuous retention ridge protrusion adjacent to a drainage channel, wherein a suction cup is optional for attaching the holder to a countertop or sink lip.

Further in the prior art, in U.S. Pat. No. 5,322,382 to Hull et al., disclosed is a combination lotion applicator and support stand, wherein the desire is to have the sponge portion slightly lower than the lotion reservoir that is disposed within the handle with the goal being to keep the sponge wetted with the lotion, which the support stand facilitates, see FIGS. 1 and 2. Also in Hull, the lotion applicator and stand are a matched set sold in combination, noting that a cover 20 is always used in conjunction with the sponge, thus to preclude external seepage of the lotion from the sponge due to the handle causing the lotion to gravity flow into the sponge.

Also, in the prior art, in U.S. Pat. No. 5,038,955 to Studer et al., disclosed is a paintbrush caddy that clips upon the edge of a paint tray while providing an inclined drainage platform for the paintbrush to reside against, thus allowing residual paint to drip back into the tray while retaining the brush via drain apertures 66, see FIGS. 2, 3, and 4. Studer also uses a spring loaded clamping means that is utilized to provide a removably engagable attachment to the tray edge while keeping the drainage platform at an angle to accommodate the paint drainage back into the tray.

Continuing, in the prior art, in U.S. Pat. No. 7,500,580 to Hawkins disclosed is a bracket that straddles the upper edges of an open paint can to form a bridge across the open paint can top that facilitates a clip type hanger disposed at a mid point in the bracket to suspend a paintbrush over the open can of paint such that brush paint drips fall back into the can, see FIGS. 3, 4, and 5. In Hawkins, the bracket can also be used to secure the paint can lid closed as shown in FIG. 6.

What is needed is a low cost, compact, and easy to install article shoe assembly that supports an article in the form of a cleaning utensil with a self contained cleaning sponge/scouring pad with a dishwashing detergent dispensing reservoir, wherein the article is supported in an upright manner to minimize seepage of the dishwashing detergent from the sponge/pad resulting in waste of the dishwashing detergent and the resultant gooey mess of seeped dishwashing detergent, and if seepage does occur, it is directed to an appropriate area.

SUMMARY OF INVENTION

Broadly the present invention is a shoe assembly utilizing a cup with a bottom and an opposing lip, for upright support of an article upon a surface in an open environment, the shoe assembly including a base, the base sized and configured to accommodate the cup bottom and include an extension with a depression disposed therein to receive a portion of the article, wherein the base further comprises a peripheral ridge that forms a part of the base depression. The base also further comprises a receiving slot forming a portion of the base depression, wherein the receiving slot is operational to receive a portion of the article to facilitate retaining different length articles, the base further comprises a receptacle formed from an interface as between the receiving slot and the peripheral ridge, the receptacle is formed as an "U" shaped inlet, wherein the receptacle adds volume to the depression for receiving a portion of the seepage from the article.

The shoe assembly also includes a flexible clip having an inward portion that is disposed upon the lip, said clip having an opposing outward portion with a cradle portion that is disposed opposite of the lip, wherein the cradle portion extends for a full width of the flexible clip along a curved axis to further support the article over the lip facing the bottom in the open environment. Wherein the flexible clip is formed as an inverted "U" shaped channel having two parallel flanges that are spaced apart, each flange having a flange inward portion and a flange outward portion, further the flanges each have an extension from and are joined by a web portion therebetween, wherein the cradle portion includes a continuously curving concave surface disposed on the web portion that is positioned opposite of the two parallel flange extensions. Wherein the continuously curving concave surface is operational to suspend in an adjacent manner the article in an open environment, wherein operationally the cradle portion concave surface retainably suspends an opposing portion of the article over the lip facing the bottom in the open environment, thus the cup retaining a portion of seepage from the article These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
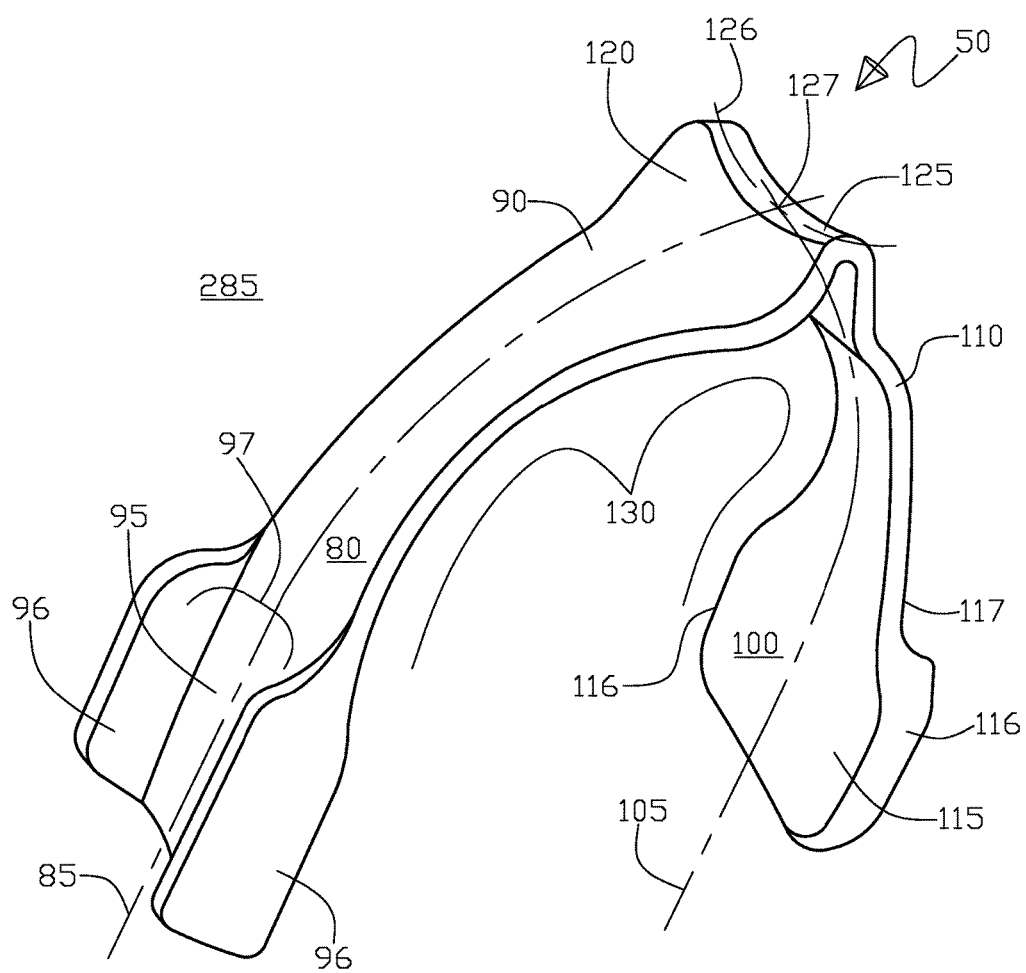
FIG. 1 shows a perspective view of a support device that includes a first arcuate flexible finger, its longitudinal axis, a first finger proximal end portion, a first finger distal end portion, a second arcuate flexible finger, its lengthwise axis, a second finger proximal end portion, a second finger distal end portion, a shoulder element, a cradle segment, and an inverted "U" shape.

50 Support device
55 Article
56 Length of article 55
57 Seepage of article 55 and sponge 66
60 Upright position or support of the article 55
61 Self-contained cleaning sponge of the article 55
62 Reservoir handle for dispensing dishwashing detergent to the sponge 61 of the article 55
65 Article in the form of a cleaning utensil being a self-contained cleaning sponge/brush/scouring pad 61 with dishwashing detergent dispensing reservoir 62 disposed therein
66 Sponge
70 Sink
71 Walls of the sink 70
75 Margin of the sink 70
80 First arcuate flexible finger
85 Longitudinal axis of the first arcuate flexible finger 80
90 First proximal end portion of the first arcuate flexible finger 80
95 First distal end portion of the first arcuate flexible finger 80
96 First curved extension of the first distal end portion 95
97 First concave channel of first curved extension 96
100 Second arcuate flexible finger
105 Lengthwise axis of the second arcuate flexible finger 100
110 Second proximal end portion of the second arcuate flexible finger 100
115 Second distal end portion of the second arcuate flexible finger 100
116 Second curved extension of the second distal end portion 115
117 Second concave channel of the second curved extension 116
120 Shoulder element
125 Cradle segment
126 Arcuate axis at the cradle segment 125
127 Perpendicular relationship of arcuate axis 126 to the longitudinal axis 85 and the lengthwise axis 105
130 Inverted "U" shape
135 Frictionally straddles
140 Shoe assembly
145 Cup
150 Bottom of cup 145
155 Opposing lip of cup 145
160 Surface
165 Base
170 Accommodate the cup bottom 150
175 Extension of the base 165
176 Peripheral ridge of the base 165
177 Receptacle of the base 165
180 Depression of the base 165
181 Receiving slot of the depression 180
185 Receiving a portion of the article 55
190 Flexible clip
200 Flange 305 inward portion of the flexible clip 190
205 Opposing flange 305 outward portion of the flexible clip 190
210 Cradle portion of the flexible clip 190
211 Curved axis of the cradle portion 210
212 Continuous curving concave surface of the cradle portion 210
215 Retainably suspending an opposing portion of the article 55
220 Platform device
225 Retention basin
226 Floor of the retention basin 225
230 Peripheral portion
231 Outer peripheral notch in peripheral portion 230 for sponge support 280
232 Inner peripheral notch in peripheral portion 230 for sponge support 280
235 Spillway margin
240 Raised rib
245 Extension
250 Extension 245 depending outwardly
251 Reverse angled end portion of extension 245
255 Substantial conforming area to the sink margin of the basin 225 and extension 245
260 Bi-modal shaped ridge
261 Continuously curving concave surface of the bi-modal shaped ridge 260
262 Bi-modal shaped ridge 260 extending at least as high as the raised rib 240
265 Parallel projection of the ridge 260 and the rib 240
270 Ridge retainably suspending a portion of the article 55 over the basin 225
275 Directing liquids to the sink 70
280 Sponge support bracket
281 Lip 155 interface of the sponge support bracket 280
282 Drain aperture for sponge support 280
285 Open environment
300 Inverted "U" shaped channel
305 Two parallel flanges of the inverted "U" shaped channel 300
310 Spaced apart distance of the two parallel flanges 305
315 Inward portion of the flange 305
320 Outward portion of the flange 305
325 Extension of the flange 305
330 Web portion that is therebetween and joins the flange 305 extensions 325
335 Suspend support in an adjacent manner of the article 55 in the open environment 285 by the continuously curving concave surface 212
340 Opposing portion of the article 55
345 Retainably suspends the opposing portion 340 of the article via the continuously curving concave surface 212 over the lip 155 facing the bottom 150 in the open environment 285
350 "U" shaped inlet of the receptacle 177
355 Volume addition of the receptacle 177 to the depression 180 showing the distances or lengths of length, width, and height that would be multiplied to equal the volume of the receptacle 177
360 Width of the cradle portion 210 of the flexible clip 190

DETAILED DESCRIPTION

Figure 2:
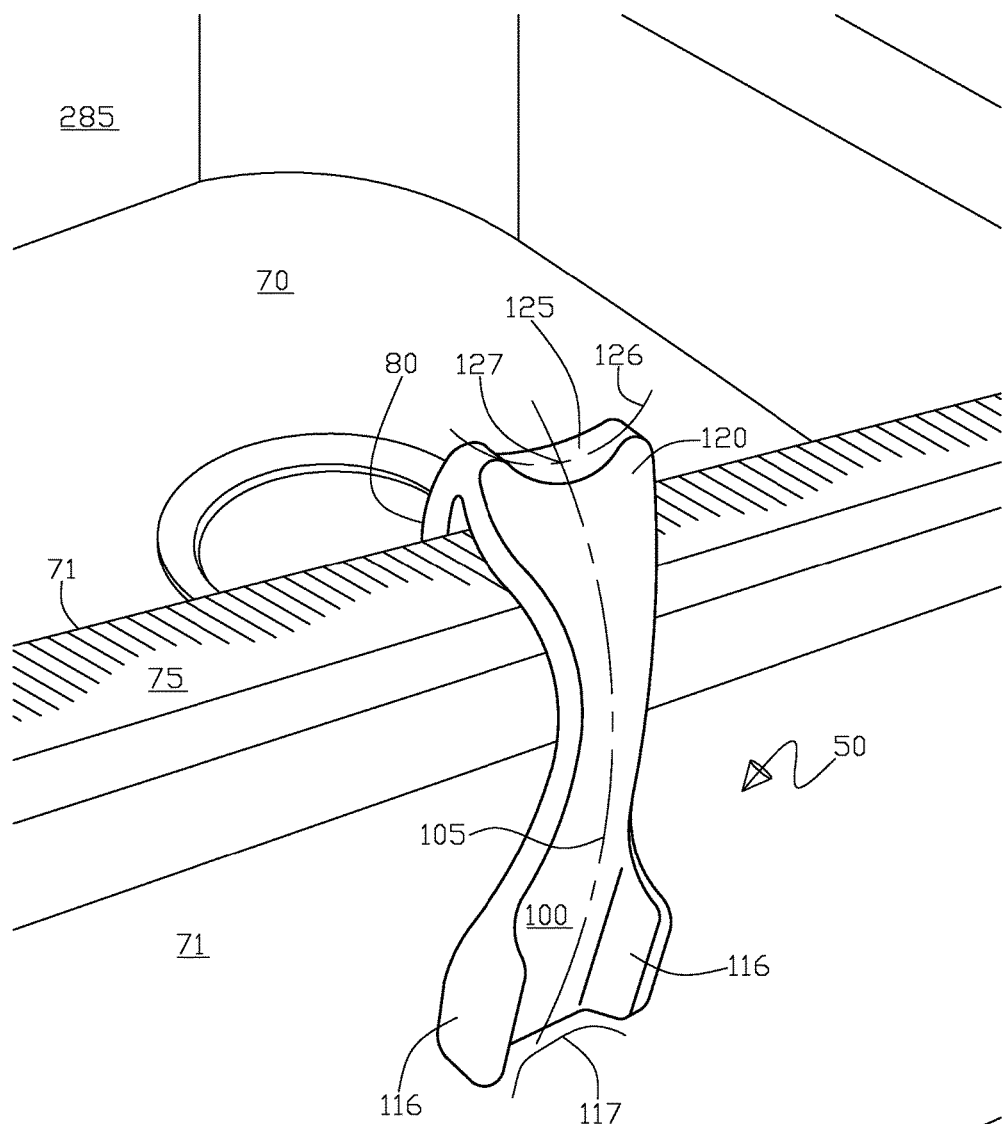
FIG. 2 shows a use perspective view of the support device straddling a margin of the sink, with the cradle segment, the shoulder element, the first arcuate flexible finger, and the second flexible finger.

With initial reference to FIG. 1, shown is the perspective view of the support device 50 that includes the first arcuate flexible finger 80, its longitudinal axis 85, the first finger 80 proximal end portion 90, the first finger 80 distal end portion 95, the second arcuate flexible finger 100, its lengthwise axis 105, the second finger 100 proximal end portion 110, the second finger 100 distal end portion 115, the shoulder element 120, the cradle segment 125, and the inverted "U" shape 130. Next, FIG. 2 shows a use perspective view of the support device 50 straddling the margin 75 of the sink 70, with the cradle segment 125, the shoulder element 120, the first arcuate flexible finger 80, and the second flexible finger 100.

Figure 3:
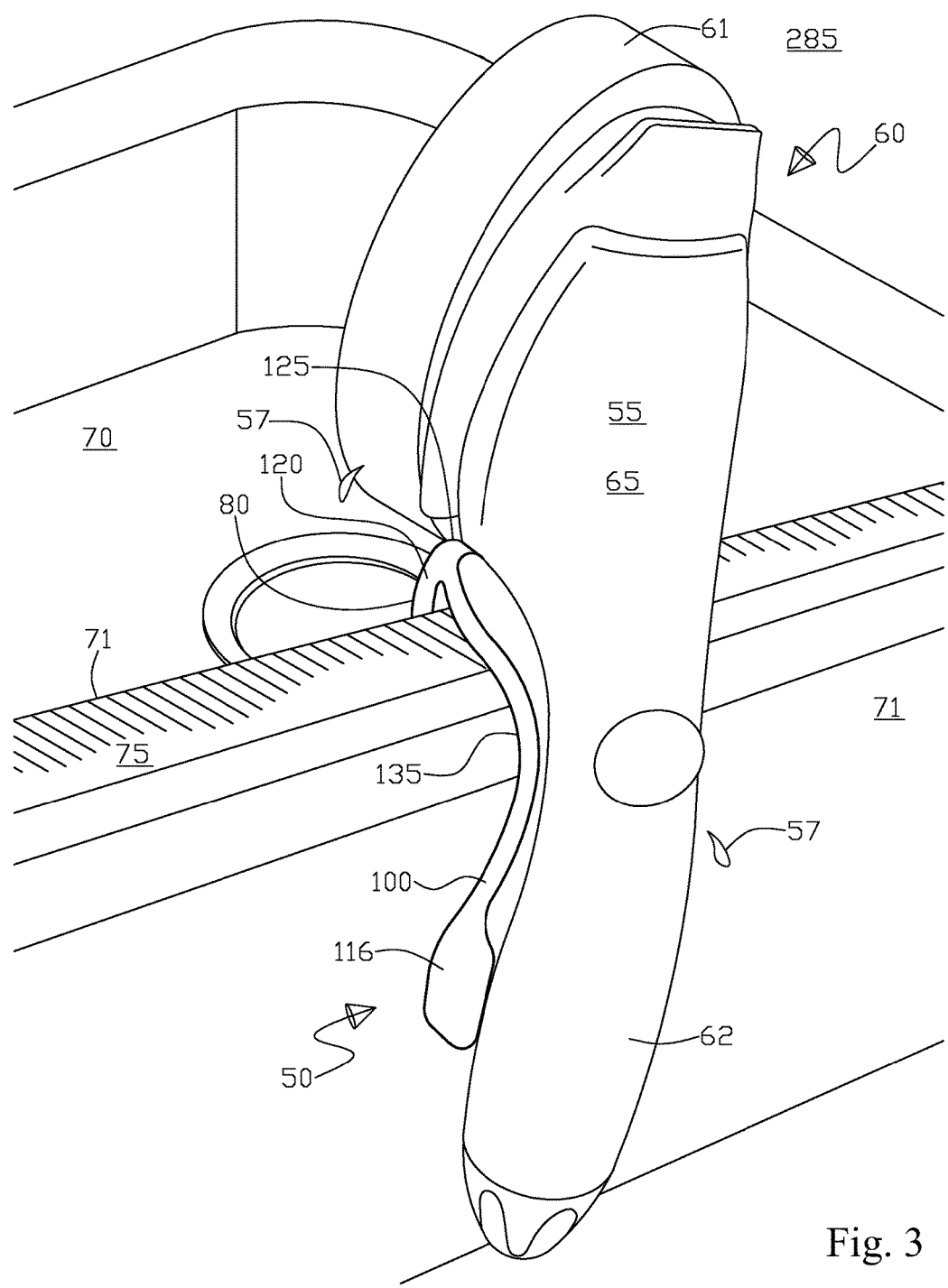
FIG. 3 shows a use perspective view of the support device straddling the margin of the sink, with the cradle segment, the shoulder element, the first arcuate flexible finger, and the second flexible finger, wherein the cradle segment is supporting the article in an upright position, with the article in the form of a cleaning utensil being the self-contained cleaning sponge having dishwashing detergent disposed therein.
Figure 4:
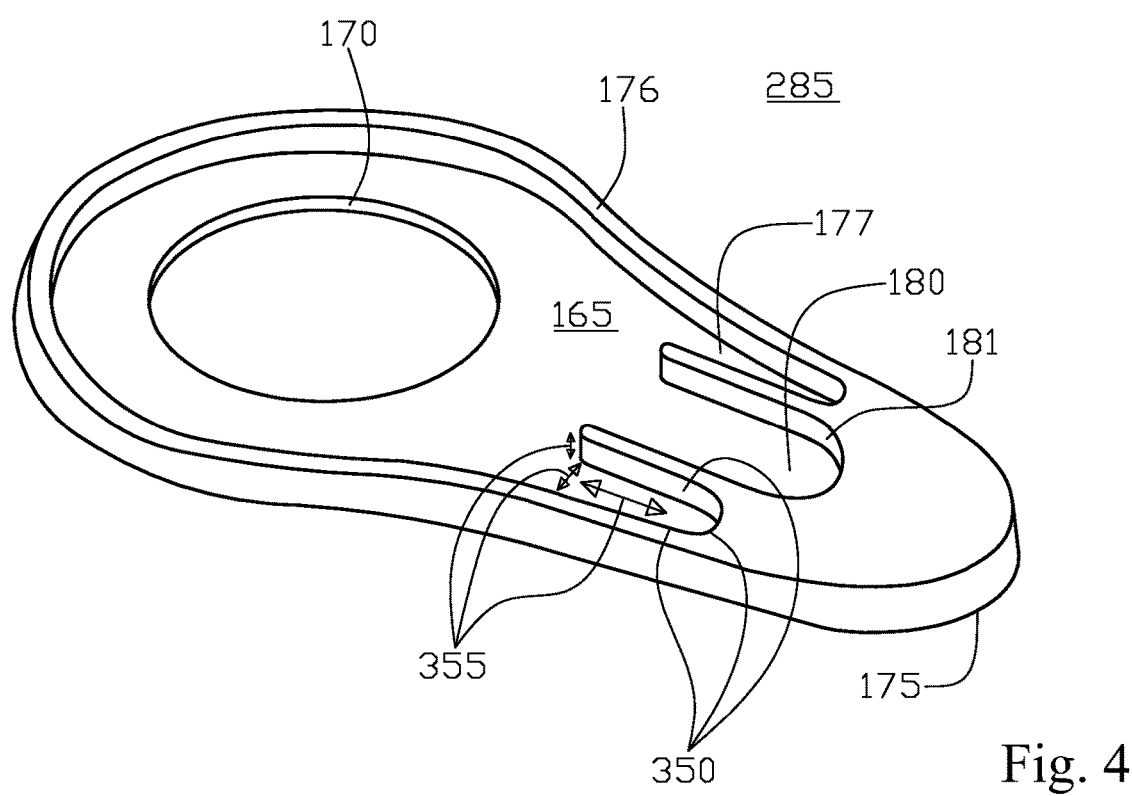
FIG. 4 shows a perspective view of the base portion of the shoe assembly including the extension of the base, and the depression of the base.
Figure 5:
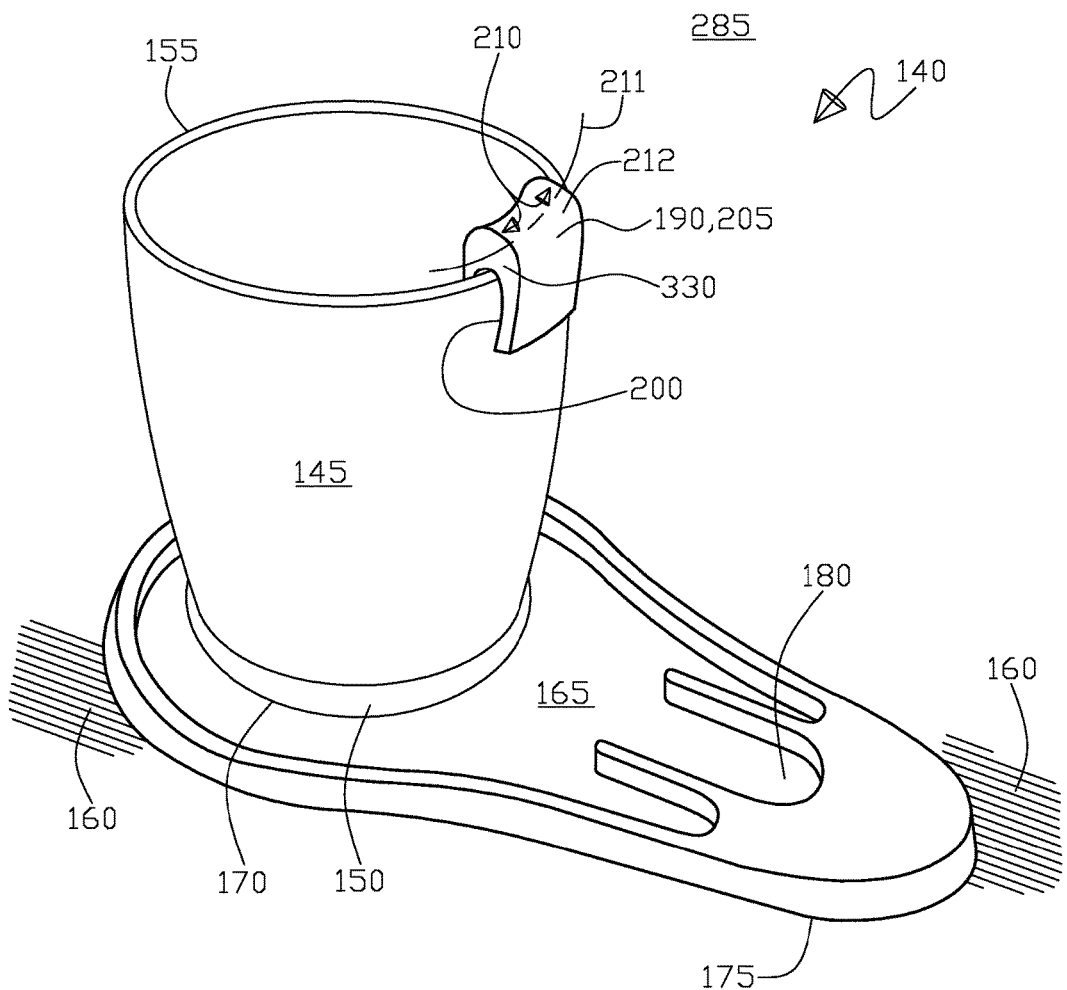
FIG. 5 shows a perspective view of the shoe assembly with the base portion, the extension of the base, the depression of the base, the cup, the bottom of the cup, the opposing lip of the cup, the cup bottom being accommodated in the base, the flexible clip, the inward portion of the flexible clip, the opposing outward portion of the flexible clip, the cradle portion of the clip, and the base upon the surface.

Continuing, FIG. 3 shows a use perspective view of the support device 50 straddling the margin 75 of the sink 70, with the cradle segment 125, the shoulder element 120, the first arcuate flexible finger 80, and the second flexible finger 100, wherein the cradle segment 125 is supporting the article 55 is in an upright position 60, with the article 55 in the form of a cleaning utensil 65 being self contained cleaning sponge having dishwashing detergent. Further, FIG. 4 shows a perspective view of the base portion 165 of the shoe assembly 140 including the extension 175 of the base 165, and the depression 180 of the base 165. Next, FIG. 5 shows a perspective view of the shoe assembly 140 with the base portion 165, the extension 175 of the base 165, the depression 180 of the base 165, the cup 145, the bottom 150 of the cup 145, the opposing lip 155 of the cup 145, the cup 145 bottom 150 being accommodated 170 in the base 165, the flexible clip 190, the inward portion 200 of the flexible clip 190, the opposing outward portion 205 of the flexible clip 190, the cradle portion 210 of the clip 190, and the base 165 upon the surface 160.

Figure 6:
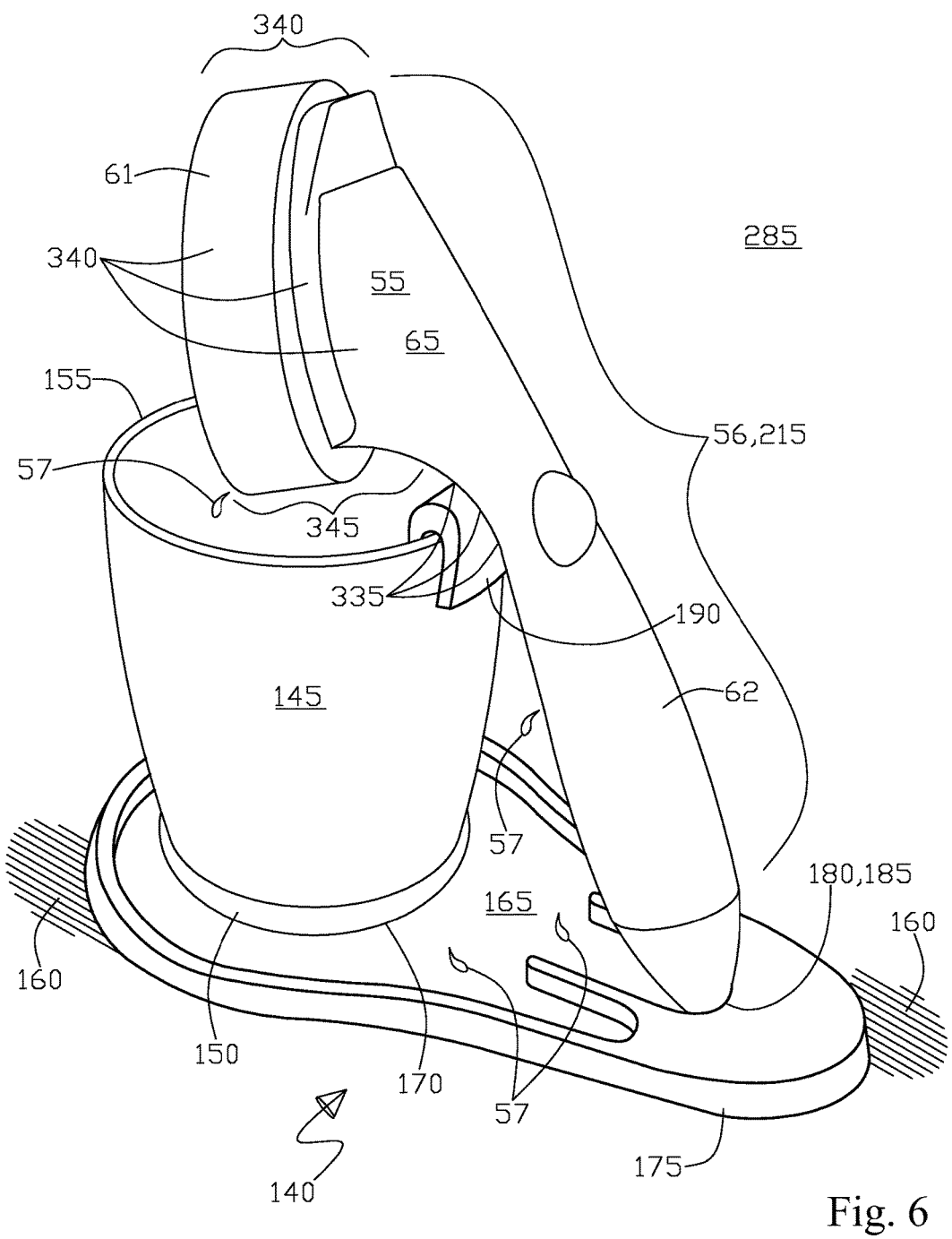
FIG. 6 shows a perspective use view of the shoe assembly with the base portion, the extension of the base, the depression of the base, the cup, the bottom of the cup, the opposing lip of the cup, the cup bottom being accommodated in the base, the flexible clip, the inward portion of the flexible clip, the opposing outward portion of the flexible clip, the cradle portion of the clip, and the base upon the surface, wherein the article is in the form of a cleaning utensil being self contained cleaning sponge having therein disposed dishwashing detergent, wherein the depression is receiving a portion of the article and the flexible clip cradling the opposing portion of the article.

Yet further, FIG. 6 shows a perspective use view of the shoe assembly 140 with the base portion 165, the extension 175 of the base 165, the depression 180 of the base 165, the cup 145, the bottom 150 of the cup 145, the opposing lip 155 of the cup 145, the cup 145 bottom 150 being accommodated 170 in the base 165, the flexible clip 190, the inward portion 200 of the flexible clip 190, the opposing outward portion 205 of the flexible clip 190, the cradle portion 210 of the clip 190, and the base 165 upon the surface 160. Also in FIG. 6, the article 55 is in the form of a cleaning utensil 65 being self contained cleaning sponge having dishwashing detergent disposed therein, wherein the depression 180 is receiving 185 a portion of the article 55 and the flexible clip 190 cradling 210 the opposing portion of the article 55.

Figure 7:
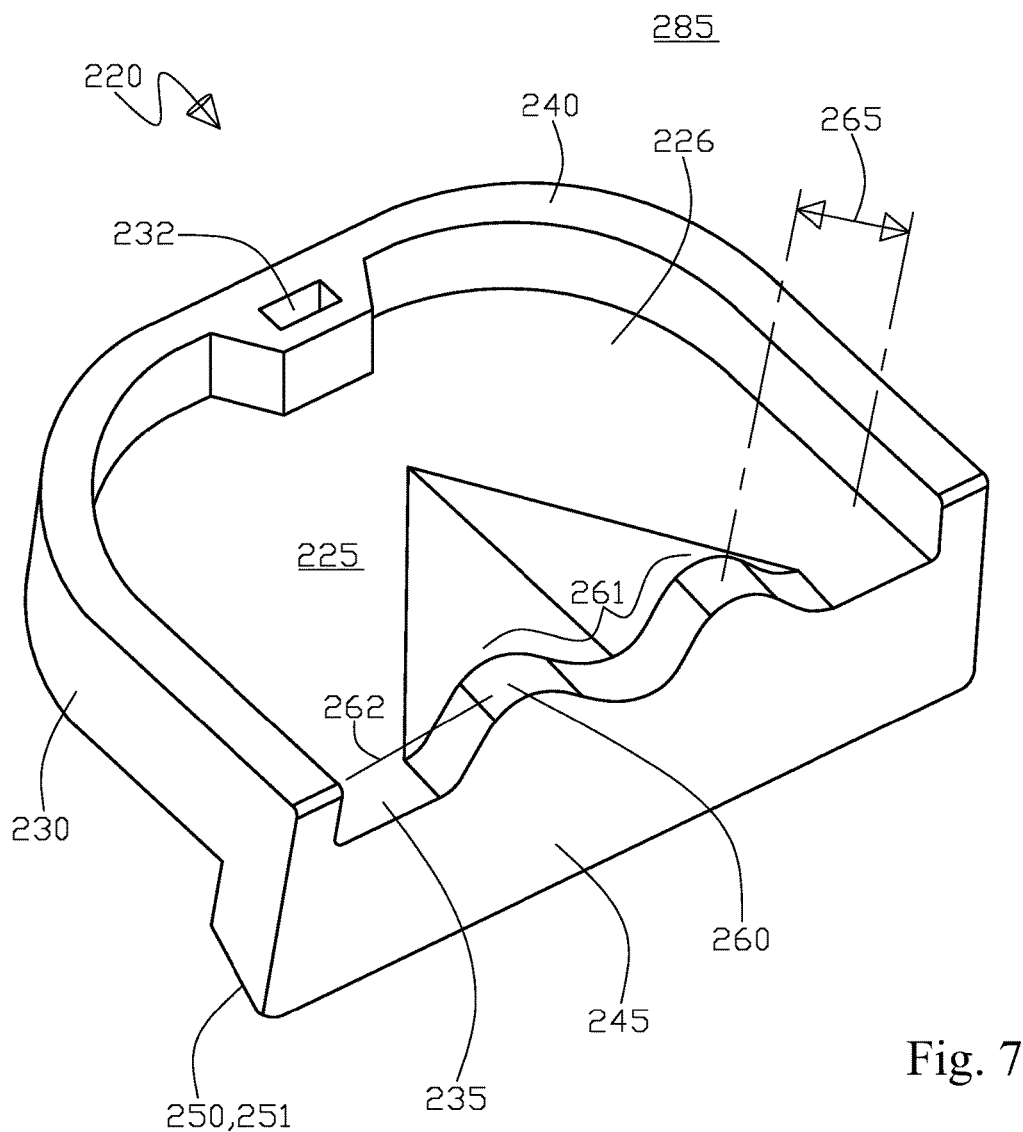
FIG. 7 shows a perspective view of the platform device with the retention basin, the peripheral portion, the spillway margin, the raised rib, the extension, with the extension depending outwardly opposite of the raised rib, and the bi-modal shaped ridge that projects parallel to the raised rib.
Figure 8:
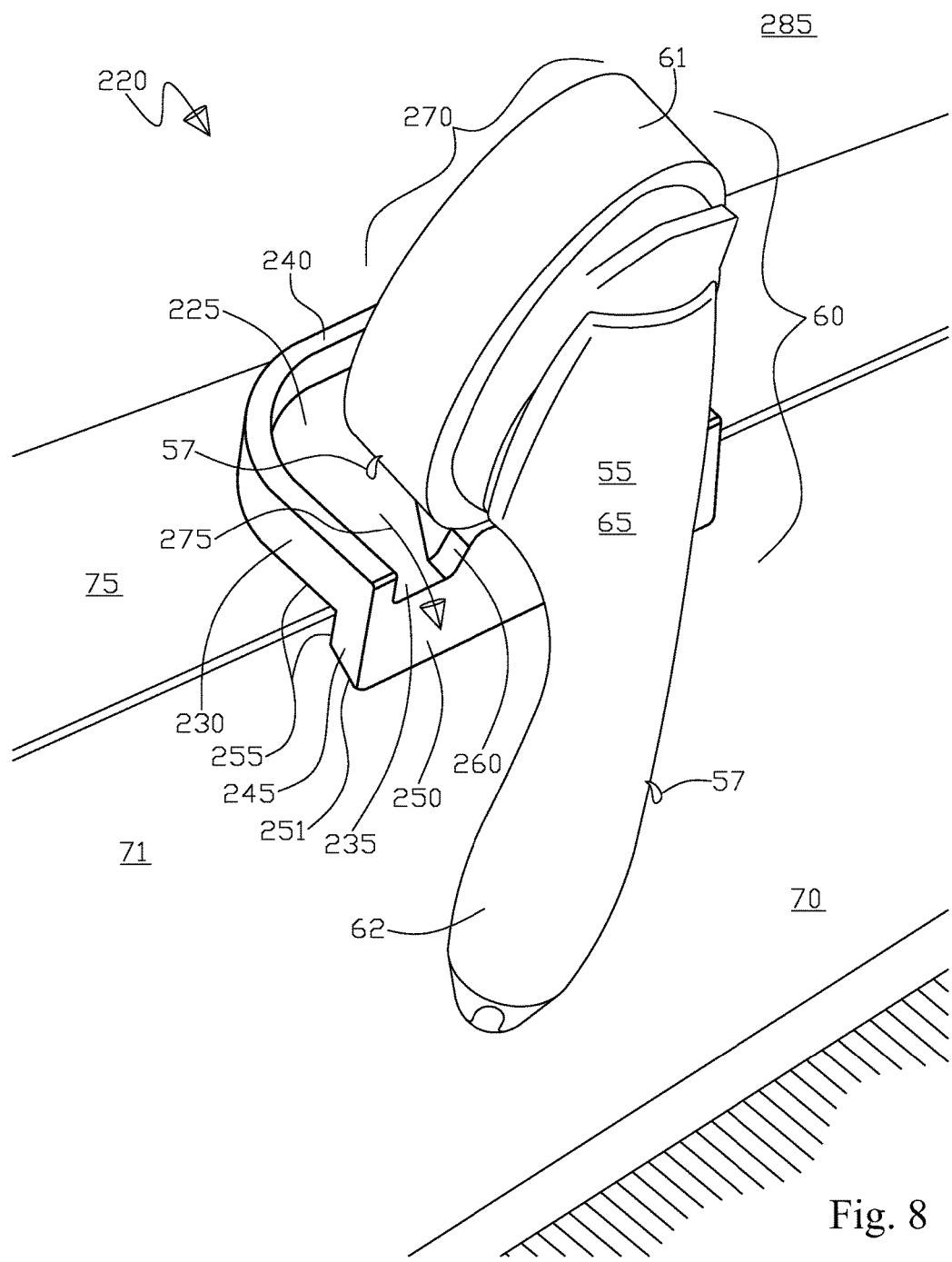
FIG. 8 shows a perspective use view of the platform device with the retention basin, the peripheral portion, the spillway margin, the raised rib, and the extension, with the extension depending outwardly opposite of the raised rib, wherein the basin and extension are substantially conforming to the sink margin of the sink, the bi-modal shaped ridge that projects parallel to the raised rib, the directing of the liquids to the sink, with the ridge retainably suspending a portion of the article over the basin, wherein the article is in the form of a cleaning utensil being self contained cleaning sponge having dishwashing detergent disposed therein.

Continuing, FIG. 7 shows a perspective view of the platform device 220 with the retention basin 225, the peripheral portion 230, the spillway margin 235, the raised rib 240, the extension 245, with the extension 245 depending outwardly 250 opposite of the raised rib 240, the bi-modal shaped ridge 260 that projects parallel 265 to the raised rib 240. Further, FIG. 8 shows a perspective use view of the platform device 220 with the retention basin 225, the peripheral portion 230, the spillway margin 235, the raised rib 240, the extension 245, with the extension depending outwardly 250 opposite of the raised rib 240, wherein the basin 225 and extension 245 are substantially conforming 255 to the sink margin 75 of the sink 70. In addition, in FIG. 8, the bi-modal shaped ridge 260 that projects parallel 265 to the raised rib 240, the directing 275 of the liquids to the sink 70, with the ridge 260 retainably suspending 270 a portion of the article 55 over the basin 225, wherein the article 55 is in the form of a cleaning utensil 65 being self contained cleaning sponge having dishwashing detergent disposed therein.

Figure 9:
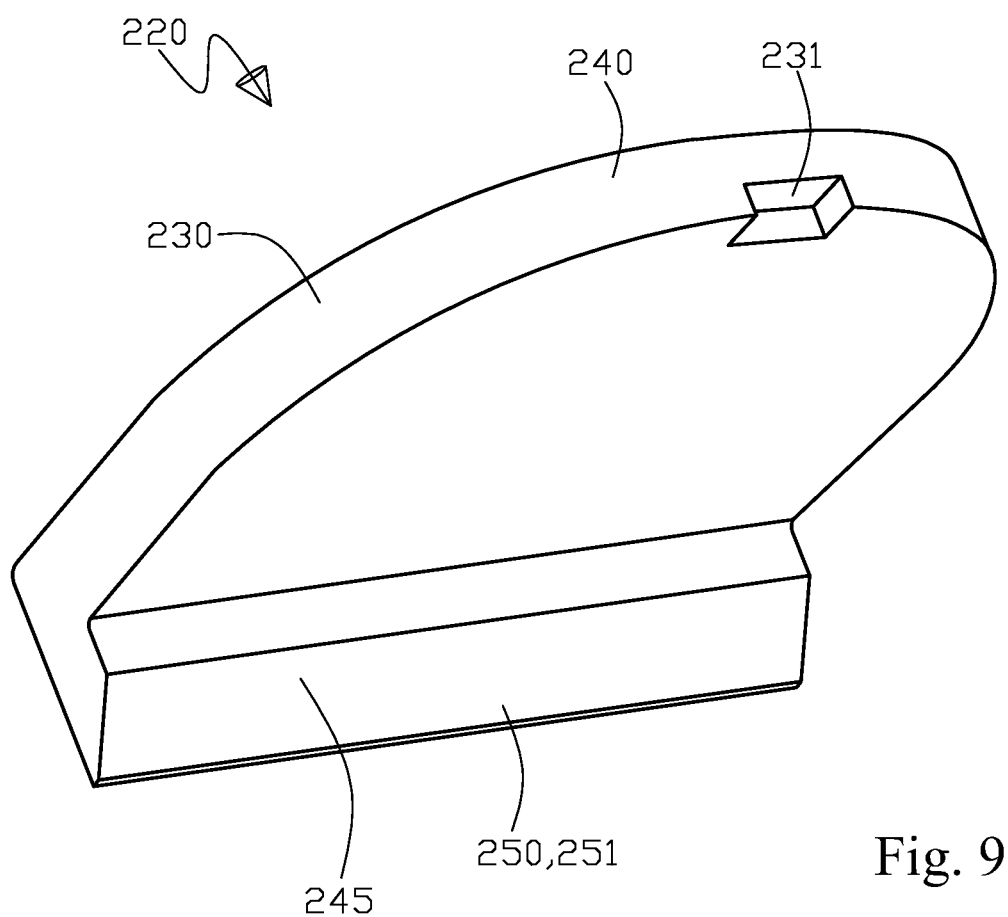
FIG. 9 shows an inverted perspective view of the platform device in relation to FIG. 7, with the peripheral portion, the raised rib, the extension, with the extension depending outwardly opposite of the raised rib.
Figure 10:
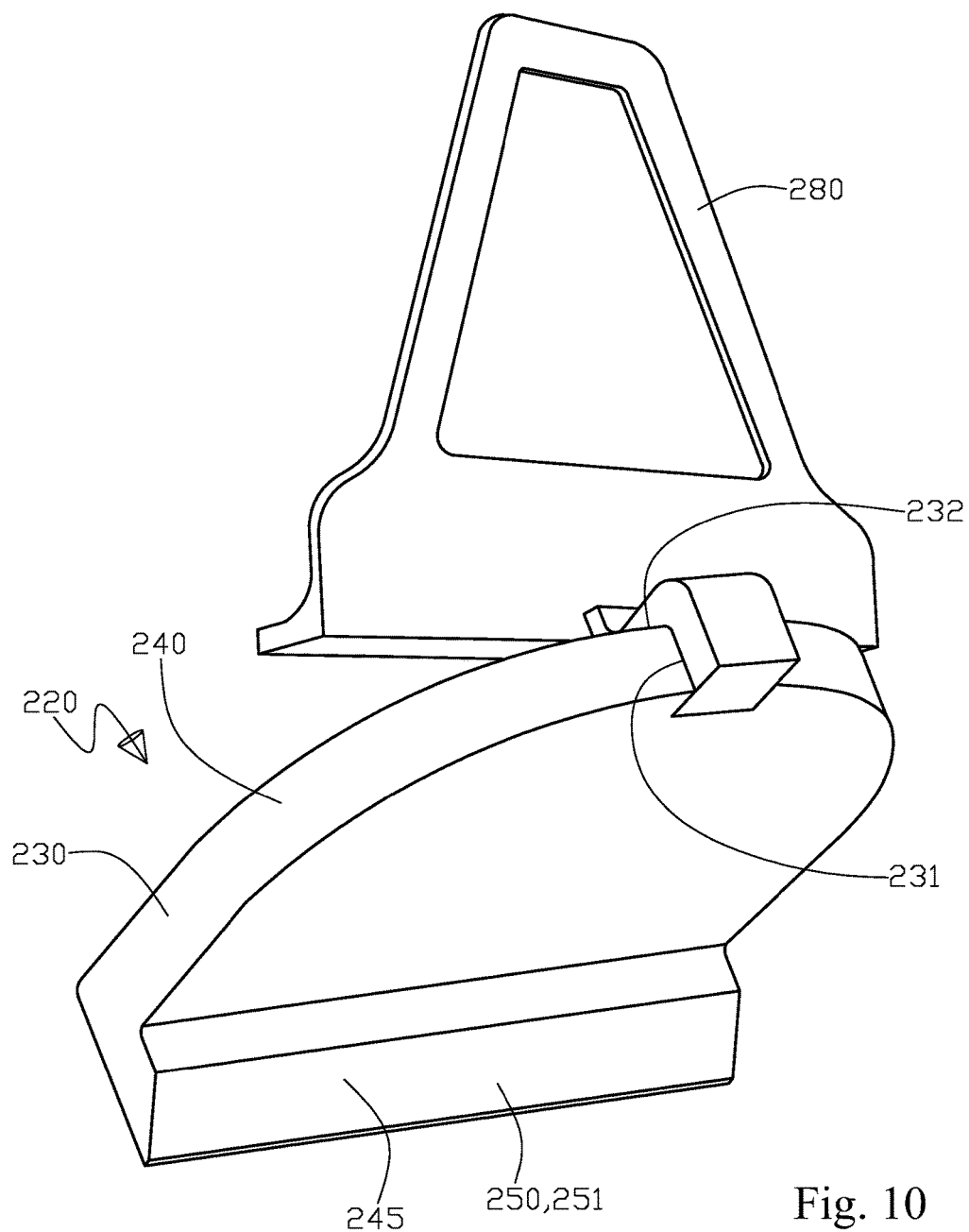
FIG. 10 shows an inverted perspective view of the platform device in relation to FIG. 7, with the peripheral portion, the raised rib, and the extension, with the extension depending outwardly opposite of the raised rib in addition to the sponge support mounted on the raised rib.
Figure 11:
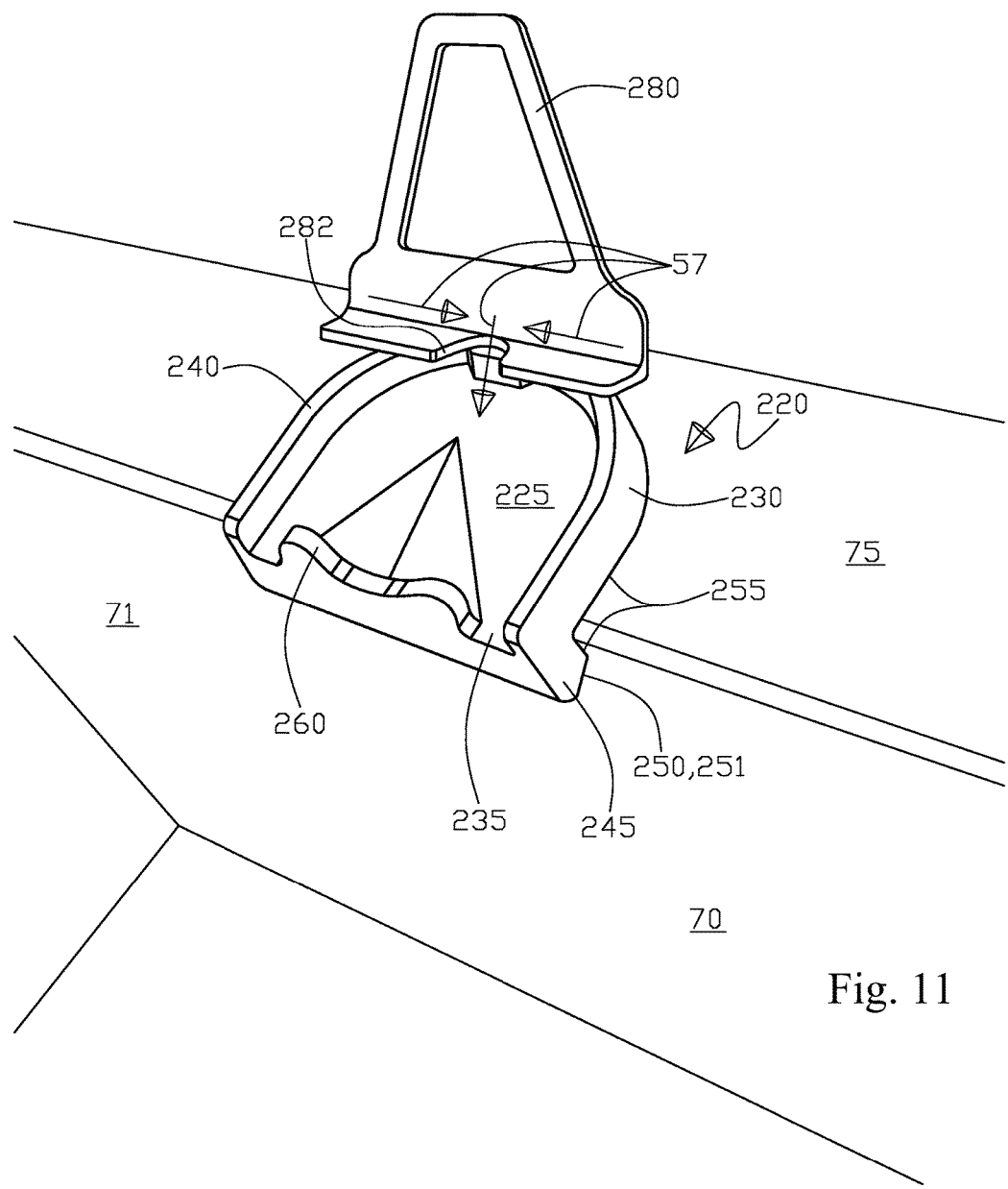
FIG. 11 shows a perspective view of the platform device with the retention basin, the peripheral portion, the spillway margin, the raised rib, and the extension, with the extension depending outwardly opposite of the raised rib, plus the substantial conforming to the sink margin of the sink for the basin and the extension, further the bi-modal shaped ridge that projects parallel to the raised rib and the sponge support are shown.

Moving onward, FIG. 9 shows an inverted perspective view of the platform device 220 in relation to FIG. 7, with the peripheral portion 230, the raised rib 240, the extension 245, with the extension 245 depending outwardly 250 opposite of the raised rib 240. Next, FIG. 10 also shows the inverted perspective view of the platform device 220 in relation to FIG. 7, with the peripheral portion 230, the raised rib 240, the extension 245, with the extension 245 depending outwardly 250 opposite of the raised rib 240 in addition to the sponge support 280 mounted on the raised rib 240. Further, FIG. 11 shows a perspective view of the platform device 220, with the retention basin 225, the peripheral portion 230, the spillway margin 235, the raised rib 240, the extension 245, with the extension 245 depending outwardly 250 opposite of the raised rib 240, the substantial conforming 255 to the sink margin 75 of the sink 70 for the basin 225 and the extension 245, the bi-modal shaped ridge 260 that projects parallel 265 to the raised rib 240, and the sponge support 280.

Figure 12:
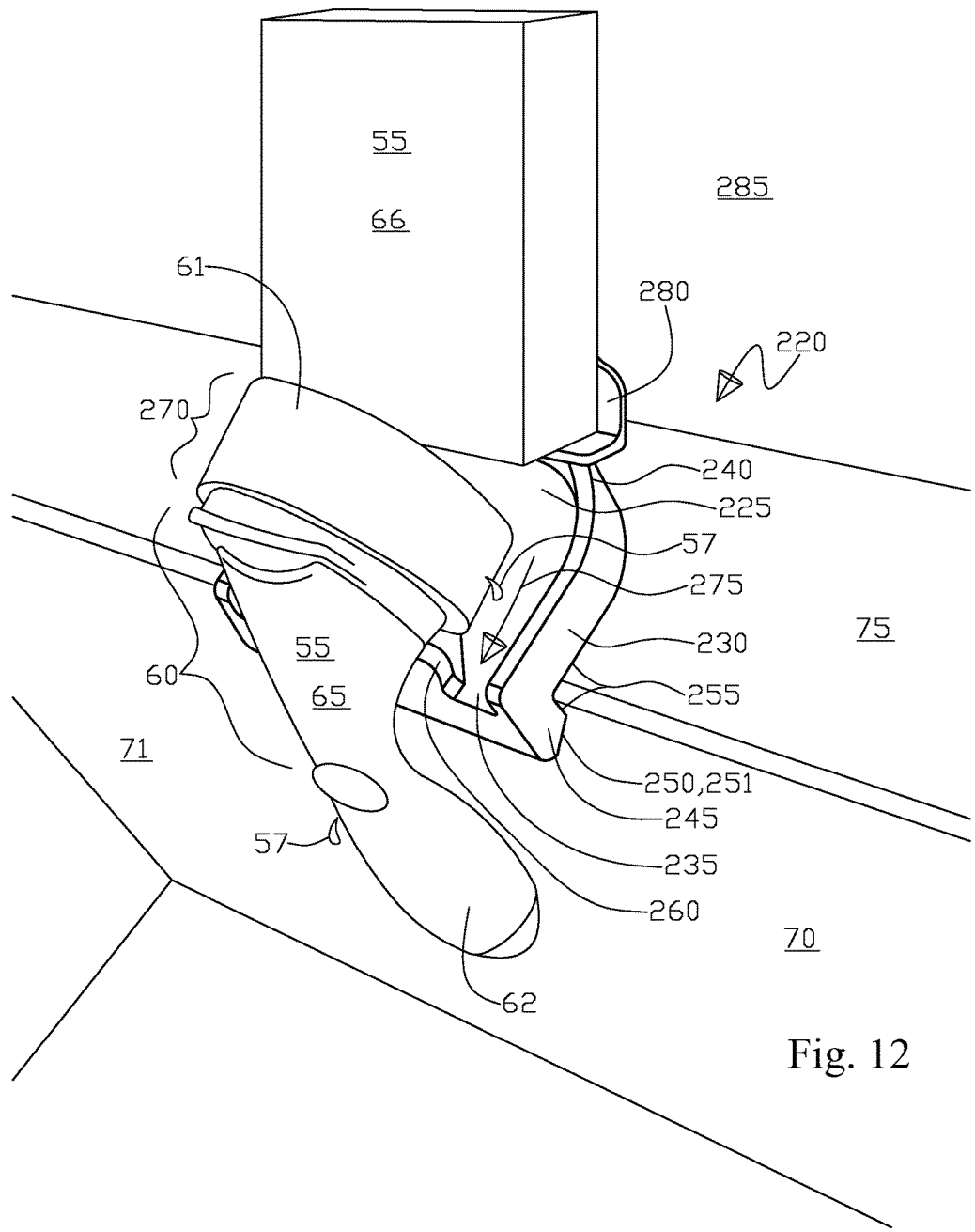
FIG. 12 shows a perspective view of the platform device with the retention basin, the peripheral portion, the spillway margin, the raised rib, the extension, with the extension depending outwardly opposite of the raised rib, the substantial conforming to the sink margin of the sink for the basin and the extension, the bi-modal shaped ridge that projects parallel to the raised rib and the sponge support, the directing of the liquids to the sink, with the ridge retainably suspending a portion of the article over the basin, wherein the article is in the form of a cleaning utensil being self contained cleaning sponge having dishwashing detergent disposed therein, also the sponge support holding a sponge.
Figure 13:
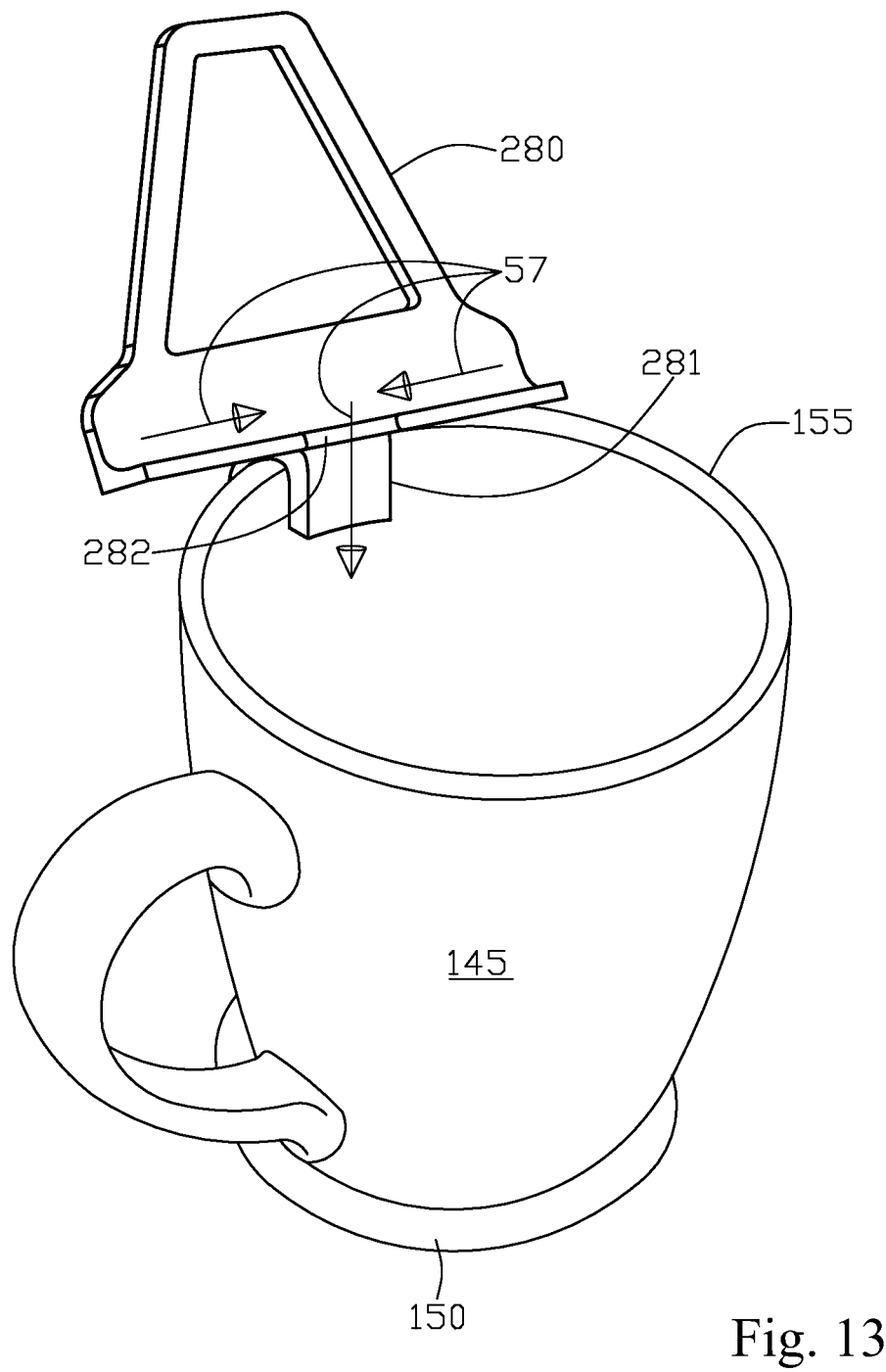
FIG. 13 shows a perspective view of the sponge support that is removably engagable to the opposing lip of the cup, with the cup, and cup bottom shown also.
Figure 14:
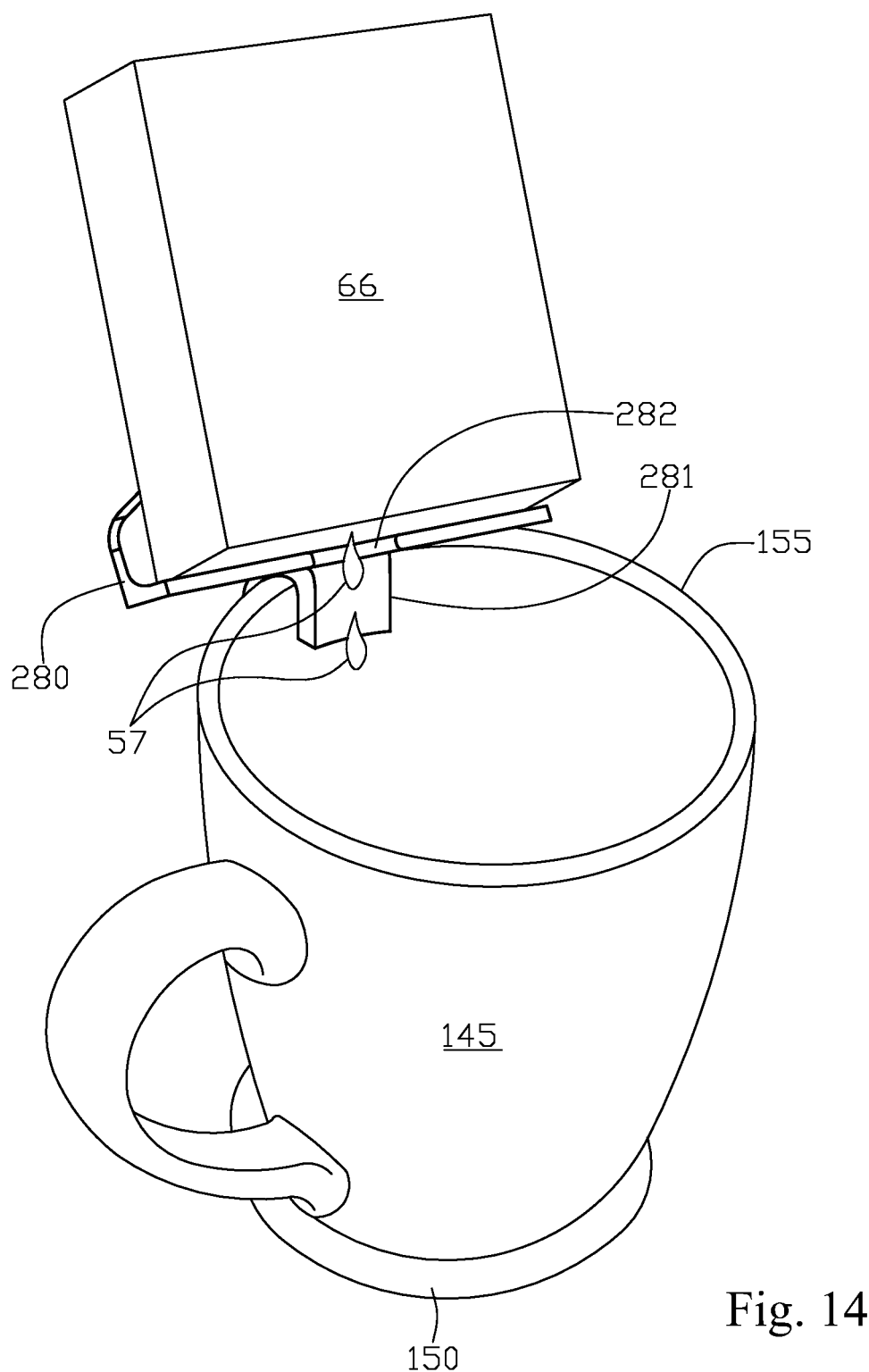
FIG. 14 shows a perspective use view of the sponge on the sponge support that is removably engagable to the opposing lip of the cup, with the cup, and the cup bottom shown also.

Continuing, FIG. 12 shows a perspective view of the platform device 220 with the retention basin 225, the peripheral portion 230, the spillway margin 235, the raised rib 240, the extension 245, with the extension 245 depending outwardly opposite 250 of the raised rib 240, the substantial conforming 255 to the sink margin 75 of the sink 70 for the basin 225 and the extension 245. Further, in FIG. 12, the bi-modal shaped ridge 260 that projects parallel 265 to the raised rib 240, and the sponge support 280, the directing 275 of the liquids to the sink 70, with the ridge 260 retainably suspending a portion of the article 55 over the basin 225, wherein the article 55 is in the form of a cleaning utensil 65 being self contained cleaning sponge having dishwashing detergent disposed therein, also the sponge support 280 holding a sponge 66. Next, FIG. 13 shows a perspective view of the sponge support 280 that is removably engagable to the opposing lip 155 of the cup 145, with the cup 145, and cup 145 bottom 150 shown also. Further, FIG. 14 shows a perspective use view of the sponge 66 on the sponge support 280 that is removably engagable to the opposing lip 155 of the cup 145, with the cup 145, and cup 145 bottom 150 shown also.

Figure 15:
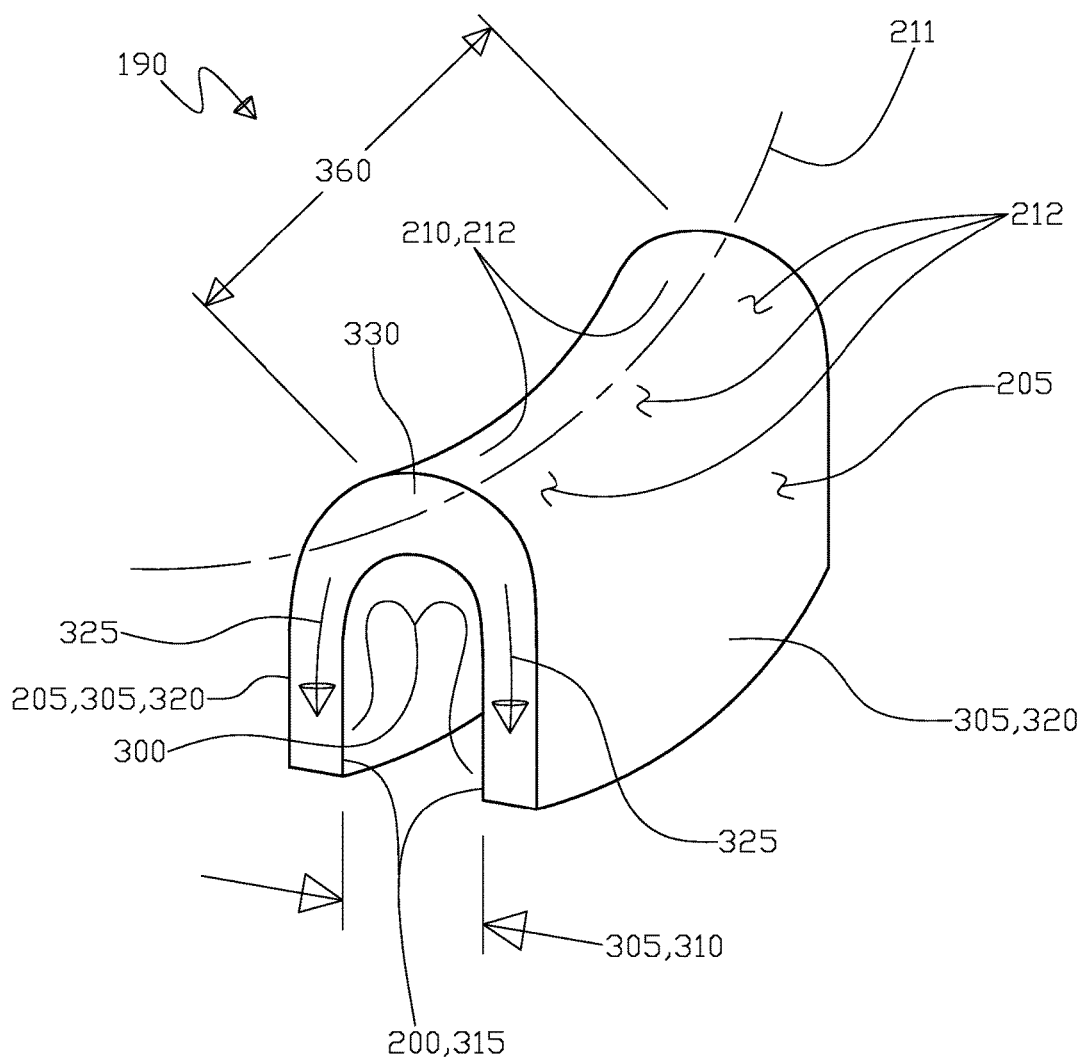
FIG. 15 shows a detailed perspective view of the shoe assembly flexible clip that includes the cradle portion, the continuous curving concave surface that is along the curved axis, further shown is an inverted "U" shaped channel, two parallel flanges that each are spaced apart by a distance being connected through a web wherein the flanges both extend away from the web, also each flange has an inward portion and an outward portion.

Further, FIG. 15 shows a detailed perspective view of the shoe assembly 140 flexible clip 190 that includes the cradle portion 210, the continuous curving concave surface 212 that is along the curved axis 211, further shown is an inverted "U" shaped channel 300, two parallel flanges 305 that each are spaced apart by a distance 310 being connected through a web portion 330, wherein the flanges 305 both extend 325 away from the web portion 330, also each flange 305 has an inward portion 315 and an outward portion 320.

Broadly, in looking at FIGS. 1 through 3, the present invention is for the support device 50 for an article 55 that is adjacent to a sink 70 margin 75, with the support device 50 including the first arcuate flexible finger 80 having the longitudinal axis 85, the first finger 80 having a proximal end portion 90 and an opposing distal end portion 95 and the second arcuate flexible finger 100 having a lengthwise axis 105, the second finger 100 having a proximal end portion 110 and an opposing distal end portion 115. Further included in the support device 50 is the shoulder element 120 that is sized and configured to cradle 125 the article 55 in an upright position 60, the shoulder element 120 is disposed in an attached manner therebetween the first proximal end portion 90 and the second proximal end portion 110. Wherein the first flexible finger 80, the shoulder element 120, and the second flexible finger 100 approximately form an inverted "U" symmetrical shape 130 that frictionally straddles 135 the sink 70 margin 75, wherein operationally the support device 50 cradles the article 55 in the upright position 60 adjacent to the sink 70 margin 75. Wherein the article 55 can be supported in either one of two opposing positions with the article 55 adjacent to the shoulder element 120 and the first arcuate flexible finger 80 or the article 55 adjacent to the shoulder element 120 and the second arcuate flexible finger 100.

Further on the support device 50 for the article 55, the shoulder element 120 can further comprise a cradle segment 125 that has a continuously curving concave surface to suspend in an adjacent manner the article 55 in an open environment 285, see FIGS. 1, 2, and 3. In addition, for the support device 50 for the article 55, the cradle segment 125 can also extend for a full width of the shoulder element 120 in an arcuate axis 126 that is perpendicular 127 to the longitudinal 85 and lengthwise 105 axes to facilitate article 55 drainage or seepage 57 in the open environment 285, again see FIGS. 1, 2, and 3. Also the article 55, as shown in FIGS. 1, 2, and 3, can be in the form of a cleaning utensil 65 being the self-contained cleaning sponge 61 having dishwashing detergent stored in a reservoir 62 in the cleaning utensil 65 handle 62, with the cleaning utensil 65 being supported by the support device 50 in the open environment 285, with the open environment 285 being defined as having free and open access all around the external surfaces of the cleaning utensil 65 for seepage 57 of the dishwashing detergent to drain back into the sink 70 without the need of a drainage channel in the support device 50, as best shown in FIG. 3.

Also, on the support device 50 for the article 55 the first 80 and second 100 arcuate flexible fingers preferably depend downwardly from the shoulder element 120 in a continuous arc from the first 90 and second 110 proximal end portions to the first 95 and second 115 distal end portions along the longitudinal 85 and lengthwise 105 axes respectively to conform to the sink margin 75 and sink walls 71 on each opposing side of the sink margin 75, as best shown in FIGS. 2 and 3. Further, on the support device 50 for the article 55 the first 95 and second 115 distal end portions can further comprise a first curved extension 96 and a respective second curved extension 116 to further support the article 55 or as preferably shown the reservoir handle 62 as shown in FIG. 3. Continuing, for the support device 50 for the article 55 wherein the first 96 and second 115 curved extensions can form respective first 97 and second 117 concave channels that are each coincident to the continuously curving concave surface of the cradle segment 125, see FIGS. 1 and 2.

As an alternative embodiment, in looking at FIGS. 4 through 6, and including FIG. 15, the shoe assembly 140 utilizes a cup 145 with a bottom 150, and the opposing lip 155, for upright support 60 of an article 55 upon a surface 160, in the open environment 285 with the shoe assembly 140 including a base 165, wherein the base 165 sized and configured to accommodate 170 the cup 145 bottom 150 and include an extension 175 with a depression 180 disposed therein to receive 185 a portion of the article 55. Further included in the shoe assembly 140 is the flexible clip 190, see FIG. 15 in particular, with the flexible clip 190 having an inward portion 200 that is disposed upon the lip 155, the clip 190 having an opposing outward portion 205 with a cradle portion 210 disposed opposite of the lip 155, wherein operationally the cradle portion 210 retainably suspends 215 an opposing portion of the article 55 over the lip 155 facing the bottom 150 in the open environment 285, see in particular FIG. 6.

Also, for the shoe assembly 140, the cradle portion 210 preferably has a continuously curving concave surface 212 to suspend in an adjacent manner the article 55 in an open environment 285, see FIGS. 5, 6, and 15 for detail. Also the article 55, as shown in FIG. 6, can be in the form of a cleaning utensil 65 being the self-contained cleaning sponge 61 having dishwashing detergent stored in a reservoir 62 in the cleaning utensil 65 handle 62, with the cleaning utensil 65 being supported by the shoe assembly 140 in the open environment 285, with the open environment 285 being defined as having free and open access all around the external surfaces of the cleaning utensil 65 for seepage 57 of the dishwashing detergent to drain back into the cup 145 and depression 180 without the need of a drainage channel in the shoe assembly 140, as best shown in FIG. 6.

Continuing for the shoe assembly 140 wherein the cradle portion 210 can extend for a full width 360 of the flexible clip 190 along a curved axis 211 to further support the article 55 over the lip 155 facing the bottom 150 in the open environment 285, as best shown in FIGS. 5, 6, and 15. In addition, for the shoe assembly 140 the base can further comprise a peripheral ridge 176 that forms a part of the base depression 180; see FIG. 4, wherein the peripheral ridge helps to retain the article 55 seepage 57, as best shown in FIG. 6. Also, for the shoe assembly 140, the base 165 can further comprise a receiving slot 181 forming a portion of the base depression 180, see FIG. 4, wherein the receiving slot 181 is operational to receive 185 a portion 62 of the article 55, namely the reservoir handle 62, to facilitate retaining different length 56 articles 55, as best shown in FIG. 6. Further, on the shoe assembly 140, the base 165 can further comprise a receptacle 177 formed from an interface as between the receiving slot 181 and the peripheral ridge 176, as best shown in FIG. 4, wherein the receptacle 177 adds volume 355 to the depression 180 for receiving a portion of the seepage 57 from the article 55, see FIG. 6. Further on the shoe assembly 140, it can further comprise a sponge support 280 that includes a support lip 281 interface that is removably engagable to the cup lip 155, being operational to support a sponge 66 in addition to the article 55, as shown in FIGS. 13 and 14.

As another alternative embodiment, in looking at FIGS. 7 through 12, the platform device 220 is for the article 55 that is adjacent to a sink 70 with a sink margin 75, the platform device includes the retention basin 225 including the peripheral portion 230 and the spillway margin 235, with the retention basin 225 having a raised rib 240 adjacent to the peripheral portion 230. Further, in the platform device 220 is the extension 245 that is affixed to the spillway margin 235, the extension 245 depending outwardly 250 opposite of the raised rib 240, wherein the basin 225 and the extension 245 substantially conform 255 to the sink 70 margin 75. Also, in the platform device 220 included is the bi-modal shaped ridge 260 affixed to a portion of the spillway margin 235, with the bimodal ridge 260 projecting parallel 265 to the raised rib 240, wherein operationally the ridge 260 retainably suspends 270 a portion of the article 55 over the basin 225 that directs article 55 liquids 275 and seepage 57 to the sink 70.

Also, for the platform device 220 for the article 55, wherein the bi-modal shaped ridge 260 can have a continuously curving concave surface 261 to suspend in an adjacent manner the article 55 to be elevated above a floor 226 of the retention basin 225 to operationally facilitate the article 55 seepage 57 throughout an entire area of the floor 226, as best shown in FIGS. 7, 8, and 12. Further, on the platform device 220 for the article 55, the bi-modal shaped ridge 260 can extend to at least as high 262 as the raised rib 240 to further ensure to suspend in an adjacent manner the article 55 to be elevated above the floor 226 of the retention basin 225 to operationally facilitate the article 55 seepage 57 throughout an entire area of the floor 226, see FIGS. 7, 8, and 12.

As for the article 55, as shown in FIGS. 8 and 12, can be in the form of a cleaning utensil 65 being the self-contained cleaning sponge 61 having dishwashing detergent stored in a reservoir 62 in the cleaning utensil 65 handle 62, with the cleaning utensil 65 being supported by the platform device 220 in the open environment 285, with the open environment 285 being defined as having free and open access all around the external surfaces of the cleaning utensil 65 for seepage 57 of the dishwashing detergent to drain back into the entire area of the floor 226 of the retention basin 225, via the sponge 61 being elevated above the floor 226, i.e. not resting upon the floor 226, with the sponge 61 being elevated above the floor 226 from the bi-modal shaped ridge 260 extending to at least as high 262 as the raised rib 240, see FIG. 7, thus suspending the sponge 61 up off of the floor 226, see FIGS. 8 and 12. Thus operationally allowing the sponge 61 to completely drain itself of dishwashing liquid and allow the floor 226 to completely drain of dishwashing liquid, plus having the benefit of less chance of the dishwashing liquid "wicking" up from the reservoir handle 62 to the sponge 61, on the floor 226 to the sink margin 75 and down the sink walls 71, as the sink walls 71 potentially being lower than the reservoir handle 62, will via gravity draw out the dishwashing liquid from the reservoir handle 62, potentially wasting the dishwashing liquid from the reservoir handle 62, of which suspending the sponge 61 up off of the floor 226 helps to prevent.

Continuing, for the platform device 220 for the article 55, wherein the peripheral portion 230 can further comprise an outer peripheral notch 231, as shown in FIG. 9 or an inner peripheral notch 232, see FIG. 7 for receiving a sponge support 280, as best shown in FIGS. 9, 10, 11, and 12. In addition, for the platform device 220 for the article 55, wherein the notch 231 is oppositely positioned from the bi-modal shaped ridge 260 on the retention basin 225 to operationally facilitate the platform device 220 to support the article 55 and a sponge 66 simultaneously, as shown in FIG. 12. Also on the platform device 220 for the article 55 the sponge support 280 can further comprise a centrally located drain aperture 282 as shown in FIG. 11. Further on the platform device 220 for the article 55 wherein the extension 245 further comprises a reverse angled end portion 251 to minimize capillary action of the article seepage 57 toward the area identified as substantially conforming 255 to the sink margin, preferably the reverse angled end portion 251 has an angle of about ten to fifteen degrees as related to the sink margin 75.

Looking in particular at FIGS. 4, 5, 6, and 15 the shoe assembly 140 is disclosed that is utilizing the cup 145 with the cup 145 bottom 150 and the opposing cup 145 lip 155, for upright support of the article 55 upon the surface 160 in the open environment 285, as best shown in FIG. 6.

Focusing on FIG. 4, the shoe assembly 140 includes the base 165, the base 165 is sized and configured to accommodate 170 the cup 145 bottom 150, see FIGS. 5 and 6, the base 165 includes the extension 175 with the depression 180 disposed therein to receive 185 through a slot 181 a portion 62 being preferably the reservoir handle 62 of the article 55, see FIG. 6. Wherein the base 165 further comprises the peripheral ridge 176 that forms a part of the base depression 180, the base 165 also further comprises the receiving slot 181 forming a portion of the base 165 depression 180, wherein the receiving slot 181 is operational to receive a portion 62 of the article 55 to facilitate retaining 215 different length 56 articles, see FIGS. 4, 5, and 6. The base 165 further comprises a receptacle 177 formed from an interface as between the receiving slot 181 and the peripheral ridge 176, the receptacle 177 is formed as an "U" shaped inlet 350, wherein the receptacle 177 adds base 165 seepage 57 retention volume 355 capacity as indicated by three combined and multiplied dimensions of length 355, width 355, and height 355 to the depression 180 for receiving 185 a portion of the seepage 57 from the article 55, see FIGS. 4 and 6.

Looking in particular at FIG. 15, further included on the shoe assembly 140 is the flexible clip 190 having the flange 305 inward portion 200 and web 330 that is disposed upon the lip 155, see also FIG. 5, the clip 190 further having the opposing outward 205 flange 305 portion with the cradle portion 210 that is disposed opposite of the lip 155, wherein the cradle portion 210 extends for a full width 360 of the flexible clip 190 along the curved axis 211 to further support 335 the article 55 over the lip 155 facing 345 the bottom 150 in the open environment 285, see FIGS. 6 and 15. Wherein the flexible clip 190 is formed as an inverted "U" shaped channel 300 having two parallel flanges 305 that are spaced apart 310 by a distance 310, each flange 305 having a flange 305 inward portion 200 and the flange 305 outward portion 205, further the flanges 305 each have an extension 325 from and are joined by the web portion 330 therebetween, wherein the cradle portion 210 includes a continuously curving concave surface 212 disposed on the web 330 that is positioned opposite of the two parallel flange 305 extensions 325, see FIG. 15. Wherein the continuously curving concave surface 212 is operational to suspend 345 in an adjacent manner 335 the article 55 in the open environment 285, wherein operationally the cradle portion 210 concave surface 212 retainably suspends 345 the opposing portion 340 of the article 55 over the lip 155 facing the bottom 150 in the open environment 285, thus the cup 145 retaining a portion of seepage 57 from the article 55, as best shown in FIG. 6.

CONCLUSION

Accordingly, the present invention of a shoe assembly has been described with some degree of particularity directed to the embodiments of the present invention. It should be appreciated, though; that the present invention is defined by the following claim construed in light of the prior art so modifications or changes may be made to the exemplary embodiments of the present invention without departing from the inventive concepts contained therein.

The invention claimed is:

1. A shoe assembly utilizing a cup with a bottom and an opposing lip, for upright support of an article upon a surface in an open environment, said shoe assembly comprising:

(a) a base, said base sized and configured to accommodate the cup bottom and include an extension with a depression disposed therein to receive a portion of the article, wherein said base further comprises a peripheral ridge that forms a part of said base depression, said base also further comprises a receiving slot forming a portion of said base depression, wherein said receiving slot is operational to receive a portion of the article to facilitate retaining different length articles, said base further comprises a receptacle formed from an interface as between said receiving slot and said peripheral ridge, said receptacle is formed as an "U" shaped inlet, wherein said receptacle adds volume to said depression for receiving a portion of the seepage from the article; and (b) a flexible clip having an inward portion that is disposed upon the lip, said clip having an opposing outward portion with a cradle portion that is disposed opposite of the lip, wherein said cradle portion extends for a full width of said flexible clip along a curved axis to further support the article over the lip facing the bottom in the open environment, wherein said flexible clip is formed as an inverted "U" shaped channel having two parallel flanges that are spaced apart, each said flange having a flange inward portion and a flange outward portion, further said flanges each have an extension from and are joined by a web portion therebetween, wherein said cradle portion includes a continuously curving concave surface disposed on said web that is positioned opposite of said two parallel flange extensions, wherein said continuously curving concave surface is operational to suspend in an adjacent manner the article in an open environment, wherein operationally said cradle portion concave surface retainably suspends an opposing portion of the article over the lip facing the bottom in the open environment, thus the cup retaining a portion of seepage from the article.

\* \* \* \* \*